United States Patent [19]

Kikuchi et al.

[11] Patent Number: 4,507,460

[45] Date of Patent: Mar. 26, 1985

[54] EPOXY RESIN COMPOSITION

[75] Inventors: Toru Kikuchi; Takayuki Saito; Akihiro Kobayashi; Hitoshi Goto, all of Hitachi, Japan

[73] Assignee: Hitachi Chemical Co., Ltd., Tokyo, Japan

[21] Appl. No.: 533,556

[22] Filed: Sep. 19, 1983

[30] Foreign Application Priority Data

Sep. 21, 1982 [JP] Japan .................................. 57-164423

[51] Int. Cl.³ .............................................. C08G 59/42
[52] U.S. Cl. ...................................... 525/507; 528/92; 528/93; 528/95; 528/112; 528/116; 528/354
[58] Field of Search ............... 528/112, 116, 354, 115, 528/93, 92, 95; 525/507

[56] References Cited

U.S. PATENT DOCUMENTS 3,294,743  12/1966  Mack .................................... 528/116

OTHER PUBLICATIONS

Klaus et al., "Reduction of Shrinkage in Epoxy Resins", J. Appl. Poly. Sci. 10, 887–889 (1966).
Liska, "Shrinkage of Epoxy Resins", Chemical Abstracts 75, 98997b (1971).

Primary Examiner—Earl A. Nielsen
Attorney, Agent, or Firm—Antonelli, Terry & Wands

[57] ABSTRACT

An epoxy resin composition comprising (A) an epoxy resin, (B) an alicyclic or aromatic polycarboxylic acid anhydride, (C) 4-ketopimelic acid dilactone, and if necessary (D) a hardening accelerator can give a cured article having excellent properties such as elongation, flexibility, hardness, tensile strength, etc.

17 Claims, No Drawings

EPOXY RESIN COMPOSITION

This invention relates to an epoxy resin composition containing a polycarboxylic acid anhydride and 4-ketopimelic acid dilactone as curing agent.

Epoxy resins are used as electrically insulating materials, for example, for embedding or encapsulating various electronic and electric parts. They are widely used also as adhesives because they have good adhesion to hard surfaces of metals, glass and the like.

However, when the epoxy resins are used for embedding or adhesion, they are different in thermal expansion coefficient from materials to be embedded or adhered such as metals and the like, and therefore when such a system is placed in a heat cycle of heating and cooling, a large stress is caused by internal strain and the system is eventually destroyed.

In order to absorb such an internal strain and prevent the production of internal stress, it is necessary to impart extensibility, i.e., flexibility to a cured epoxy resin.

As methods of imparting flexibility to a cured epoxy resin, there are, for example, a method in which a flexible epoxy resin such as a diglycidyl ester of dimer acid, a bisphenol side chain type epoxy resin, a diglycidyl ether of polyoxyalkylene glycol or the like is incorporated; a method in which a polyamide obtained from a dimer acid and an excess of diamine, dodecenylsuccinic anhydride or the like is used as a curing agent; and a method in which a flexibility-imparting agent such as a polyester having a hydroxyl group at an end, a polyoxyalkylene glycol or the like is incorporated. However, these methods have been disadvantageous in that mechanical properties such as hardness, tensile strength and the like of the resulting cured products are greatly degraded.

As curing agents for epoxy resins, alicyclic or aromatic polycarboxylic acid anhydrides are often used, but they cannot impart flexibility to a cured product.

There has been reported in J. Applied Polym. Sci., Vol. 10, p. 887 (1966) a case where 4-ketopimelic acid dilactone alone is used as a curing agent for an epoxy resin and the shrinkage of the resulting cured product is examined. However, when 4-ketopimelic acid dilactone alone is used as a curing agent for an epoxy resin, the volume shrinkage during cure reaction is slight, but the resulting cured product is very low in hardness and very easy to be injured, and hence is of no practical use.

One object of this invention is to solve this problem.

Further, there is such a disadvantage in that 4-ketopimelic acid dilactone is crystalline having a melting point of 65° C. and therefore when it alone is used as a curing agent for an epoxy resin, it should be heated to its melting point or higher in order to mix it homogeneously with the epoxy resin, so that the pot life is short.

Another object of this invention is to solve this problem.

This invention solves these problems and provides an epoxy resin composition which can give a cured epoxy resin having good elongation or extensibility and high tensile strength without lowering the hardness.

That is to say, this invention relates to an epoxy resin composition comprising (A) a epoxy resin,
(B) an alicyclic or aromatic polycarboxylic acid anhydride, and
(C) 4-ketopimelic acid dilactone.

The 4-ketopimelic acid dilactone as the component (C) used in this invention is a compound represented by the formula:

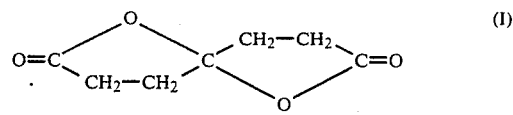

This 4-ketopimelic acid dilactone can be produced by processes described in Annalen der Chemie Vol. 253, p. 206 (1980) and German Offenlegungsschrift No. 2,136,886, wherein 4-ketopimelic acid dilactone is obtained by heating succinic anhydride at a high temperature in the presence of an alkali catalyst to proceed bimolecular decarboxylation condensation. When this 4-ketopimelic acid dilactone alone is used as an agent for curing an epoxy resin, the volume shrinkage during cure reaction is slight, but the resulting cured product is very low in hardness (Barcol hardness) and it is very easy to damage and hence is if no practical use.

However, by simultaneous use of 4-ketopimelic acid dilactone and an alicyclic or aromatic polycarboxylic acid anhydride as agent for curing an epoxy resin, a tough cured epoxy resin having extensibility and high tensile strength can be obtained without lowering the hardness (Barcol hardness).

As the alicyclic or aromatic polycarboxylic acid anhydride as the component (B) used in this invention, there may be used hexahydrophthalic anhydride, methylhexahydrophthalic anhydride, tetrahydrophthalic anhydride, methyltetrahydrophthalic anhydride, 3,6-endomethylenetetrahydrophthalic anhydride, methyl-3,6-endomethylenetetrahydrophthalic anhydride, phthalic anhydride, pyromellitic anhydride, chlorendic anhydride, and the like.

The alicyclic or aromatic polycarboxylic acid anhydride is preferably one that is liquid at ordinary temperatues.

As the alicyclic or aromatic polycarboxylic acid anhydride which is liquid at ordinary temperatures, there are alicyclic polycarboxylic acid anhydrides which are known as liquid, such as methylhexahydrophthalic anhydride, methyltetrahydrophthalic anhydride, methylendomethylenetetrahydrophthalic anhydride and the like, and these are used alone or in admixture of two or more of them. There are also eutectic mixtures of hexahydrophthalic anhydride, tetrahydrophthalic anhydride, phthalic anhydride, chlorendic anhydride, and the like.

The above-mentioned alicyclic polycarboxylic acid anhydrides which are liquid at ordinary temperatures are mixtures of their stereoisomers or structural isomers. The mixtures of the stereoisomers are mixtures of cis and trans forms of the above-mentioned alicyclic polycarboxylic acid anhydrides, and can be obtained by mainly heating the individual cis forms in the presence or absence of a basic catalyst or by hydrogenating methyltetrahydrophthalic anhydride. As to the ratio between the individual cis and trans forms, the former/the latter is preferably 7/3 to 3/7, particularly preferably 6/4 to 4/6. The mixtures of the structural isomers can be obtained by mainly using methyltetrahydrophthalic anhydride (in particular, 3- or 4-methyl-$\Delta^4$-tetrahydrophthalic anhydride) as a starting material and heating it in the presence of an acidic catalyst or a noble metal catalyst. The mixture of the structural isomers comprises structural isomers which are different from one another in the position of double bond in the six-membered ring.

The aforesaid basic catalyst includes dibutylaniline, alkali metal compounds and the like. The alkali metal compounds include, for example, hydroxides of alkali metals such as lithium hydroxide, sodium hydroxide, potassium hydroxide and the like; and oxides of alkali metals such as lithium oxide, sodium oxide, potassium oxide and the like.

The aforesaid acidic catalyst includes phosphoric acid, polyphoshoric acid, silica-alumina catalyst and the like.

The aforesaid noble metal catalyst includes palladium black and the like.

As catalyst which may be used for the above-mentioned hydrogenation, there are palladium, nickel and the like.

In the above, the reaction in the presence of a basic catalyst is preferably effected at 150° C. or higher and the reaction in the absence of any catalyst is preferably effected at 200° C. or higher. The hydrogenation is preferably effected at 50° to 80° C. in the case of palladium catalyst and at 130° to 180° C. in the case of nickel catalyst. The structural isomerization is preferably conducted at 150° C. or higher. When palladium black is used, disproportionation takes place at the same time.

The aforesaid eutectic mixtures include, for example, a mixture of about 80% by weight of hexahydrophthalic anhydride and about 20% by weight of tetrahydrophthalic anhydride, a mixture of about 50% by weight of hexahydrophthalic anhydride, about 25% by weight of tetrahydrophthalic anhydride and about 25% by weight of phthalic anhydride, etc.

In this invention, the alicyclic or aromatic polycarboxylic acid anhydride and 4-ketopimelic acid dilactone are incorporated so that the ratio of the former to the latter may be 95/5 to 30/70, preferably 85/15 to 40/60 by weight. When this ratio exceeds 95/5, the flexibility of the cured product obtained by reacting the two with the epoxy resin is lowered, and when it is less than 30/70, the cured product is flexible but is lowered in hardness and easy to be injured.

4-Ketopimelic acid dilactone has a melting point of 65° C. Therefore, in order to mix it efficiently with the epoxy resin and prolong the pot life of the epoxy resin composition, it is preferably used in such a state that it is liquid at ordinary temperatures. Accordingly, it is preferable that as the alicyclic or aromatic polycarboxylic acid anhydride, one that is liquid at ordinary temperatures is used, and that the component (B) and the component (C) are previously mixed and used in the form of a liquid acid anhydride composition. In this case, when 4-ketopimelic acid dilactone is present in a too large amount, it is not completely dissolved, and therefore the liquid alicyclic or aromatic polycarboxylic acid anhydride and 4-ketopimelic acid dilactone are preferably incorporated so that the ratio of the former to the latter may be 65/35 by weight or more.

In this invention, acid anhydrides other than the component (B) and the component (C) may be co-used. Such acid anhydrides include dodecenylsuccinic anhydride, diisobutenylsuccinic anhydride, polyazelaic polyanhydride, succinic anhydride and the like. The amount of such acid anhydrides is preferably 10% weight or less, particularly preferably 5% by weight or less based on the total amount of the acid anhydrides. When the amount of such anhydrides is too large, mechanical strength of the cured product obtained by reaction with the epoxy resin tends to be lowered.

In particular, succinic anhydride is a starting material for 4-ketopimelic acid dilactone and is often inevitably contained therein depending on the degree of purification of 4-ketopimelic acid dilactone. When this succinic anhydride exists in a large amount in the above-mentioned liquid acid anhydride composition, it crystallizes and deposits during storage, so that the composition becomes a heterogeneous mixture. Therefore, the succinic anhydride content of the above-mentioned liquid acid anhydride composition is preferably adjusted to 1% by weight or less. For this purpose, it is preferable to purify 4-ketopimelic acid dilactone sufficiently after its production. As methods for the purification, there are distillation, extraction with an organic solvent such as chloroform or the like, etc.

As the epoxy resin used in this invention, there can be used compounds having in the molecule two or more epoxy groups, and there may be exemplified epi-bis type epoxy resins represented by diglycidyl ether of bisphenol A; alicyclic epoxy resins represented by cyclohexene oxide derivatives; novolak type epoxy resins which are glycidyl ether compounds of phenol novolak, cresol novolak or the like; and the like.

Further, in order to obtain a cured product from the epoxy resin composition of this invention, there may be properly selected and incorporated, as a component (D), compounds known as hardening accelerator, for example, tertiary amines and their salts, quaternary ammonium compounds, alkali metal alcoholates, metal salts of fatty acids, and the like. Examples of these compounds include benzyldimethylamine, 2,4,6-tris(dimethylaminomethyl)phenol, 2-ethyl-4-methylimidazole, triamylammonium phenolate, sodium hexanetroil, 1,8-diazabicyclo-[5,4,0]-undecene-7, tin octylate and the like.

The amounts to be used of the component (A), the component (B), the component (C), and the optionally used component (D) are as follows.

The component (B) and the component (C) are used as curing agents for the epoxy resin and are used so that the sum of their amounts may be preferably 30 to 150 parts by weight, particularly preferably 50 to 120 parts by weight per 100 parts by weight of the component (A).

The optionally used component (D) is used in an amount of preferably less than 5 parts by weight, particularly preferably 0.1 to 3 parts by weight per 100 parts of the epoxy resin as the component (A).

The epoxy resin composition of this invention may contain one or more diluents, extenders, inorganic fillers, pigments, dyes, plasticizers, organic solvents, fluidity controlling agents, antifoaming agents, flame-retardants and the like in such a range that the effects of this invention are not lessened.

This invention is illustrated by way of the following Examples in which all parts are by weight.

EXAMPLE 1

To 100 parts of Epikote 828 (a trade name, mfd. by Shell Chemical Co., Ltd; an epi-bis type epoxy resin, epoxy equivalent weight 185) were added 67 parts of methylhexahydrophthalic anhydride which was liquid at ordinary temperatures and 33 parts of 4-ketopimelic acid dilactone, and they were heated to 70° C. and sufficiently mixed. Thereafter, 1.0 part of 2-ethyl-4-methylimidazole was added as a hardening accelerator, and the resulting composition was heated at 120° C. for 3 hours and then at 150° C. for 15 hours to be cured.

Tensile tests on the thus obtained cured product were carried out by use of No. 1 type test pieces according to the tensile test method for plastics of JIS K7113-1977. As a result thereof, the tensile strength was 910 (kg/cm$^2$) and the elongation was 14.5%. The Barcol hardness (Barcol Impressor GY 934-1) of the cured product was 38.

tive Example 1), and in the case of the combination of the epoxy resin and only 4-ketopimelic acid dilactone, the elongation was high but the tensile strength and the hardness are low (Comparative Example 2). It can also be seen that the cured products obtained by using methylhexahydrophthalic anhydride and methyltetrahydrophthalic anhydride which are liquid at ordinary temperatures have low elongation values (Comparative Examples 3 and 4).

TABLE 1

| | | Recipes and test results | | | | | | | |
|---|---|---|---|---|---|---|---|---|---|
| | | Example 2 | Example 3 | Example 4 | Example 5 | Comparative Example 1 | Comparative Example 2 | Comparative Example 3 | Comparative Example 4 |
| Recipes (parts by weight) | Epikote 828 | 100 | 100 | 100 | 100 | 100 | 100 | 100 | 100 |
| | HN-5500 | 33 | 50 | 33 | — | — | — | 100 | — |
| | HN-2200 | — | — | — | 67 | — | — | — | 100 |
| | 4-Ketopimelic acid dilactone | 17 | 50 | 67 | 33 | — | 100 | — | — |
| Test results | Tensile strength (Kg/cm2) | 810 | 850 | 740 | 890 | 580 | 550 | 650 | 680 |
| | Elongation (%) | 14.9 | 14.3 | 14.7 | 13.1 | 5.4 | 15.5 | 7.8 | 6.7 |
| | Barcol hardness | 36 | 37 | 36 | 41 | 37 | 13 | 37 | 42 |

Note
HN-5500: liquid methylhexahydrophthalic anhydride
HN-2200: liquid methyltetrahydrophthalic anhydride

EXAMPLES 2 to 4

Epikote 828, methylhexahydrophthalic anhydride which was liquid at ordinary temperatures, and 4-ketopimelic acid dilactone were used according to each of the recipes shown in Table 1, and 1.0 part of 2-ethyl-4-methylimidazole was added as a hardening accelerator, after which the resulting composition was cured under the same conditions as in Example 1. The thus obtained cured product was tested in the same manner as described in Example 1. The test results are shown in Table 1.

EXAMPLE 5

To 100 parts of Epikote 828 were added 67 parts of methyltetrahydrophthalic anhydride which was liquid at ordinary temperatures and 33 parts of 4-ketopimelic acid dilactone, and 1.0 part of 2-ethyl-4-methylimidazole was added as a hardening accelerator, after which the resulting composition was cured under the same conditions as in Example 1. The thus obtained cured product was tested in the same manner as described in Example 1. The test results are shown all together in Table 1.

COMPARATIVE EXAMPLES 1 to 4

Epikote 828, the same methylhexahydrophthalic anhydride as described above which was liquid at ordinary temperatures, and the same methyltetrahydrophthalic anhydride as described above which was liquid at ordinary temperatures were used according to each of the recipes shown in Table 1, and 1.0 part of 2-ethyl-4-methylimidazole was added as a hardening accelerator. Then, the resulting composition was cured under the same conditions as in Example 1, and the thus obtained cured product was tested as in Example 1. The test results are shown in Table 1.

As is clear from the results shown in Table 1, the cured products of the epoxy resin compositions of this invention are excellent in all of tensile strength, elongation and hardness (Examples 2 to 5). When the epoxy resin alone was used, the elongation was low (Compara-

EXAMPLE 6

To 67 g of the same methylhexahydrophthalic anhydride as described above which was liquid at ordinary temperatures was added 33 g of 4-ketopimelic acid dilactone containing 0.5% by weight of succinic anhydride, and they were homogeneously mixed at 70° C. to obtain a liquid acid anhydride mixture. The viscosity at 20° C. of this mixture was 170 centipoises. When the mixture was allowed to stand at room temperature for 1 week, no crystal was deposited.

Further, 100 parts of the liquid acid anhydride mixture obtained was added to 100 parts of Epikote 828 (a trade name, mfd by Shell Chemical Co., Ltd; an epi-bis type epoxy resin, epoxy equivalent weight 185), and 1.0 part of 2-ethyl-4-methylimidazole was added thereto as a hardening accelerator, after which they were sufficiently mixed. Thereafter, the resulting composition was heated at 120° C. for 3 hours and then at 150° C. for 15 hours to obtain a cured product. The tensile tests on the cured product obtained were carried out by use of No. 1 type test pieces accoding to the tensile test method for plastics of JIS K7113. As a result thereof, the elongation was 14.5%, and the tensile strength was 910 kg/cm$^2$. The hardness measured by means of a Barcol Inpressor (GY 934-1) was 42.

EXAMPLE 7

To 67 g of the same methyltetrahydrophthalic anhydride as described above which was liquid at ordinary temperatures was added 33 g of 4-ketopimelic acid dilactone containing 0.5% by weight of succinic anhydride, and they were homogeneously mixed at 70° C. to obtain a liquid acid anhydride mixture. The viscosity at 20° C. of this mixture was 185 centipoises, and even when the mixture was allowed to stand at room temperature for 1 week, no crystal was deposited. Further, 100 parts of the liquid acid anhydride obtained was added to 100 parts of Epikote 828, and in exactly the same manner as in Example 6, a cured product was produced and then subjected to tensile tests. As a result thereof, the elongation was 13.1%. The tensile strength was 890 kg/cm². The Barcol hardness was 41.

COMPARATIVE EXAMPLE 5

In exactly the same manner as in Example 6 except that the 4-ketopimelic acid dilactone containing 0.5% by weight of succinic anhydride was replaced by polyazelaic polyanhydride (m.p. 56° C.), a cured product was produced and then subjected to the tensile tests. As a result thereof, the elongation was 9.7%. The tensile strength was 670 kg/cm². The Barcol Hardness was 16.

From these facts, it can be seen that the liquid acid anhydride is the component imparting flexibility to the cured articles.

The aforesaid methylhexahydrophthalic anhydride which was liquid at ordinary temperatures was a mixture of 70% by weight of 4-methylhexahydrophthalic anhydride which was liquid at ordinary temperatures and was obtained by hydrogenating 4-methyl-$\Delta^4$-tetrahydrophthalic anhydride at 150° C. in the presence of Raney nickel catalyst and 30% by weight of 3-methylhexahydrophthalic anhydride which was liquid at ordinary temperatures and was obtained by hydrogenating 3-methyl-$\Delta^4$-tetrahydrophthalic anhydride in the same manner as described above.

The aforesaid methyltetrahydrophthalic anhydride which was liquid at ordinary temperatures was obtained by heating a mixture of 61% by weight of 4-methyl-$\Delta^4$-tetrahydrophthalic anhydride and 39% by weight of 3-methyl-$\Delta^4$-tetrahydrophthalic anhydride at 190° C. for 3 hours in the presence of polyphosphoric acid.

The epoxy resin composition of this invention gives a cured product excellent in elongation and tensile strength without lowering the hardness. Therefore, when the composition is used as a casting resin, particularly when an electronic part or the like is encapsulated with the composition, formation of cracks and stress placed on a semiconductor can be reduced remarkably, so that the reliability is improved. Also when the composition is used as an adhesive, warping and distortion are reduced.

What is claimed is:

1. An epoxy resin composition comprising
   (A) an epoxy resin,
   (B) an alicyclic or aromatic polycarboxylic acid anhydride or mixture thereof, and
   (C) 4-ketopimelic acid dilactone; the total weight of the components (B) and (C) being 30 to 150 parts by weight per 100 parts by weight of the component (A) and the weight ratio of (B)/(C) being 95/5 to 30/70.

2. A composition according to claim 1, wherein the alicyclic or aromatic polycarboxylic acid anhydride is liquid at ordinary temperatures.

3. A composition according to claim 2, wherein the alicyclic polycarboxylic acid anhydride is methylhexahydrophthalic anhydride, methyltetrahydrophthalic anhydride, or a mixture thereof.

4. A composition according to claim 1, wherein the component (B) in liquid form and the component (C) is mixed previously to give an acid anhydride composition, which is to be mixed with the component (A).

5. A composition according to claim 4, wherein the acid anhydride composition contains 1% by weight or less of succinic anhydride.

6. A composition according to claim 1, which further comprises (D) a hardening accelerator.

7. A composition according to claim 6, wherein the hardening accelerator is a tertiary amine, a quaternary ammonium compound, an alkali metal alcoholate, or a metal salt of fatty acid.

8. A composition according to claim 6, wherein the component (D) is used in an amount of 0.1 to 3 parts by weight per 100 parts by weight of the component (A).

9. A composition according to claim 1, wherein the alicyclic or aromatic polycarboxylic acid anhydride is at least one member selected from the group consisting of hexahydrophthalic anhydride, methylhexahydrophthalic anhydride, tetrahydrophthalic anhydride, methyltetrahydrophthalic anhydride, 3,6-endomethylenetetrahydrophthalic anhydride, methyl-3,6-endomethylenetetrahydrophthalic anhydride, phthalic anhydride, pyromellitic anhydride and chlorendic anhydride.

10. A cured article of epoxy resin obtained by using the composition of claim 1.

11. A composition according to claim 1, wherein the weight ratio of (B)/(C) is 85/15 to 40/60.

12. A composition according to claim 1, wherein the acid anhydride component (B) is methylhexahydrophthalic anhydride, methyltetrahydrophthalic anhydride, methyl-3,6-endomethylenetetraphthalic anhydride, or a mixture thereof.

13. A composition according to claim 1, wherein the acid anhydride (B) is a mixture of hexahydrophthalic anhydride and at least one member selected from the group consisting of methylhexahydrophthalic anhydride, methyltetrahydrophthalic anhydride, and methyl-3,6-endomethylenetetraphthalic anhydride.

14. A composition according to claim 1, wherein the acid anhydride (B) is methylhexahydrophthalic anhydride.

15. A composition according to claim 1, wherein the acid anhydride (B) is methyltetrahydrophthalic anhydride.

16. A composition according to claim 1, wherein the acid anhydride (B) is methyl-3,6-endomethylenetetraphthalic anhydride.

17. A composition according to claim 1, wherein the acid anhydride (B) is a mixture of methylhexahydrophthalic anhydride and hexahydrophthalic anhydride.

* * * * *